US011095458B2

(12) United States Patent
Dasen et al.

(10) Patent No.: US 11,095,458 B2
(45) Date of Patent: Aug. 17, 2021

(54) HARDWARE SECURITY MODULE THAT ENFORCES SIGNATURE REQUIREMENTS

(71) Applicant: Securosys SA, Zürich (CH)

(72) Inventors: Marcel P. Dasen, Baar (CH); Melanie R. Raemy Grob, Bonstetten (CH); Lewin Boehnke, Zürich (CH)

(73) Assignee: Securosys SA, Zürich (CH)

( * ) Notice: Subject to any disclaimer, the term of this patent is extended or adjusted under 35 U.S.C. 154(b) by 162 days.

(21) Appl. No.: 16/559,910

(22) Filed: Sep. 4, 2019

(65) Prior Publication Data

US 2020/0084044 A1   Mar. 12, 2020

Related U.S. Application Data

(60) Provisional application No. 62/727,625, filed on Sep. 6, 2018.

(51) Int. Cl.
*H04L 29/06* (2006.01)
*H04L 9/32* (2006.01)
*H04L 9/08* (2006.01)

(52) U.S. Cl.
CPC .......... *H04L 9/3247* (2013.01); *H04L 9/0825* (2013.01); *H04L 9/0894* (2013.01); *H04L 9/3213* (2013.01)

(58) Field of Classification Search
CPC ... H04L 9/3247; H04L 9/0825; H04L 9/0894; H04L 9/3213
See application file for complete search history.

(56) References Cited

U.S. PATENT DOCUMENTS

| 6,151,677 | A | 11/2000 | Walter et al. |
|---|---|---|---|
| 6,782,477 | B2 | 8/2004 | McCarroll |
| 8,868,916 | B2 | 10/2014 | Shapiro |
| 2004/0039925 | A1 | 2/2004 | McMillan et al. |
| 2011/0185180 | A1* | 7/2011 | Gullberg ............ G06Q 20/3829 713/176 |
| 2015/0280921 | A1* | 10/2015 | Geoffrey ............... H04L 9/3247 713/176 |

(Continued)

FOREIGN PATENT DOCUMENTS

NO   2020/001735 A1   2/2020

OTHER PUBLICATIONS

Zongwei Zhou, Jun Han, Yue-Hsun Lin, Adrian Perrig, Virgil Gligor; Kiss: "Key it Simple and Secure" Corporate Key Management; CyLab and Carnegie Mellon University, Pittsburgh, Pennsylvania, United States; 18 pages; 2013.

(Continued)

*Primary Examiner* — Sher A Khan
(74) *Attorney, Agent, or Firm* — Kowert, Hood, Munyon, Rankin & Goetzel, P.C.; Lawrence J. Merkel

(57) ABSTRACT

In an embodiment, an HSM may provide a cryptographic signature service. The HSM may maintain key/token pairs for various users/entities and for a first entity for which signature may be desired. The HSM may ensure that the requirements for the entity's signature are met, and then may apply the entity's signature. In an embodiment, the HSM may augment the private token for the first entity with the public keys of users/entities which are to approve the entity's signature. As the approvals are received, the HSM may record the approvals and may apply the signature once the approvals are received.

22 Claims, 8 Drawing Sheets

(56) References Cited

U.S. PATENT DOCUMENTS

| | | | |
|---|---|---|---|
| 2015/0358161 A1 | 12/2015 | Kancharla et al. | |
| 2017/0054561 A1* | 2/2017 | Schleiff | H04L 9/30 |
| 2017/0262189 A1* | 9/2017 | Ali | G06F 3/0608 |
| 2018/0302227 A1* | 10/2018 | Seegebarth | H04L 9/0897 |
| 2018/0302400 A1* | 10/2018 | Covdy | H04L 63/0442 |
| 2018/0367311 A1* | 12/2018 | Stahlberg | H04L 63/101 |
| 2020/0169415 A1* | 5/2020 | Schmidt | H04L 9/3247 |

OTHER PUBLICATIONS

Jincheol Kim, Youngeok Kim and Taehun Kim; Implementation of Secure GOOSE Protocol using HSM; Applied Mechanics and Materials Online: Dec. 13, 2012; vols. 260-261, pp. 236-241; 2013 Trans Tech Publications, Switzerland; 2013; 7 pages.

Clemens Orthacker, Martin Centner, and Christian Kittl; Qualified Mobile Server Signature; Institute for Applied Information Processing and Communications (IAIK): SEC 2010, IFIP AICT 330, pp. 103-111, 2010. c IFIP International Federation for Information Processing 2010; 9 pages.

Florian Reimair; Cloud-Based Signature Solutions: A Survey; Version 1.0, Zentrum für sichere Informationstechnologie—Austria Secure Information Technology Center—Austria; Oct. 8, 2014; 15 pages.

PKCS #11 Cryptographic Token Interface Base; Specification Version 2.40 Plus Errata 01; OASIS Standard ncorporating Approved Errata 01; May 13, 2016; 147 pages.

Anonymous: "Financial Cryptography, Third International Conference, FC'99", Financial Cryptography. Third International Conference, FC'99. Proceedings Feb. 22-25, 1999, Feb. 25, 1999 (Feb. 25, 1999), 278 pages.

Anonymous: "AWS CloudHSM: User Guide", Jun. 11, 2016 (Jun. 11, 2016), 128 pages.

ISR/WO, PCT/IB2019/000862, mailed Dec. 18, 2019, 11 pages.
IPRP, PCT/IB2019/000862, mailed Sep. 10, 2020, 25 pages.

* cited by examiner

HARDWARE SECURITY MODULE THAT ENFORCES SIGNATURE REQUIREMENTS

This application claims benefit of priority to U.S. Provisional Patent Application Ser. No. 62/727,625, filed on Sep. 6, 2018. The above application is incorporated by reference in its entirety. To the extent that anything in the incorporated application conflicts with the material expressly set forth herein, the material expressly set forth herein controls.

BACKGROUND

Technical Field

Embodiments described herein are related to a hardware security module, and more particularly to electronic object signature in a hardware security module.

Description of the Related Art

Electronic objects, such as electronic documents, are often signed to indicate the signer's intention to commit to the contents of the object or to ensure that the object remains unchanged after signature. The signature needs to be validated in some fashion so that other individuals/entities can rely on the signature to evidence the signer's commitment. Electronic object signing may be used to ensure the integrity of the object (e.g. ensuring that the object has not been modified subsequent to the signing of the object), authentication of the object, commitment to the object (e.g. signing a document may commit the signer to the contents of the document, such as a contract).

One mechanism for validating a signature is to sign the electronic file containing the object using a cryptographic key assigned to the signer. The cryptographic key can be, for example, part of a key pair. The key pair includes a public key and a private token or other private secret. The private token/secret will be referred to herein as a private token. The private token is generally kept in secrecy and can be used to apply the signature to the object or a unique representation of the object, such as hash of the object. The private token may also be used to perform other operations such as decryption, authentication, integrity verification, etc. Various uses of private tokens will be referred to herein as private token usage. The public key can be shared with others, for public key usage such as verifying that the signature was applied by the signer. Other public key usages can include encryption, integrity verification, authentication, etc.

The key pair (or public key/private token pair) can be a highly-trusted mechanism for signing electronic objects. Maintaining the trust, however, requires the secrecy of the private token. In some cases, a hardware security module (HSM) is used to maintain the private token. In an HSM, the private tokens are only indirectly accessed by transmitting request to the HSM to perform operations using the private tokens. Thus, not even the signer may access the private token. Usage of the private token is governed by the access protection mechanism of the HSM. In some cases, the identity of the signer may be required to be proven. This can be achieved by storing the public key or public keys, including certificates or other tokens, such as Kerberos tokens, of the allowed signers together with the private token, to validate the signers identity.

A signer can be an individual, or an entity. The entity can be any defined organization that is able to act as a unit and communicate with other entities. Examples of entities can include individuals, a group of humans organized to be a participant in a task (e.g. a for-profit, not-for-profit, or non-profit organization such as a business, a group of entities that have agreed to act together, a club, etc.), etc. In the case of an entity, there can be rules controlling when the signature of the entity can be applied to an object. For example, a group of individuals associated with the entity may be assigned authority to act on the entity's behalf (e.g. officers of the entity, such as a chief execution officer, chief operating officer, chief financial officer, director, executive director, member of the board of directors, etc.). Depending on the nature of the document, one or more of the individuals can be required to approve the document before the entity's signature can be applied. For example, two individuals may be required if the dollar amount involved in a document exceeds a certain level. More individuals can be required at even higher levels. The requirements are generally detailed in a policy established by the entity.

Requiring multiple approvals while maintaining the security of private tokens in an HSM is challenging. Some cases require that a user or administrator log into the HSM and use the keys there to perform the signature (or to put a portion of the HSM that performs signatures online, where it normally remains offline). Such a solution can permit access to the private tokens, which can compromise security. In another case, entity-written code may be installed on the HSM, but such a solution opens the HSM to attack via nefarious code.

SUMMARY

In an embodiment, an HSM may provide a cryptographic signature service. The HSM may maintain public key/private token pairs for various entities. The HSM may ensure that the requirements for the entity's signature are met, and may apply the entity's signature once the requirements are met. The HSM may, in an embodiment, implement the signature service without permitting code to be installed on the HSM by the entity, or any other individual or entity except for the manufacturer of the HSM. The HSM may implement the signature service without requiring an administrator to log in to the HSM and put the service online or to make any other changes to the HSM. In an embodiment, the HSM may augment the private token for an entity with the public keys of entities who are to approve the entity's signature. As the approvals are received, the entity may record the approvals and may apply the signature once the requirements are met. The requirements may include one or more conditions. For example, the conditions may include groups with individual quorum (e.g. N out of M entities in the group may be a quorum, where N is less than M). The conditions may include timing behavior, e.g. execution delay and timeout. Multiple conditions may be combined via logical AND, OR and NOT and combinations thereof.

In an embodiment, a group may include one or more approval tokens to validate approvals. An approval token may be, for example, a certificate, a public key or token such as a Kerberos token, or another method to mathematically verify the identity of the entity to which the approval token is assigned. In an embodiment, a timestamp may be used to measure timing requirements. Conditions may also include veto functionality, in which an approving entity may disapprove the usage of the private token and thereby overrule an approval even if other conditions have been met. The veto may be for a single private token usage or for multiple requests.

BRIEF DESCRIPTION OF THE DRAWINGS

The following detailed description makes reference to the accompanying drawings, which are now briefly described.

Figure 1:
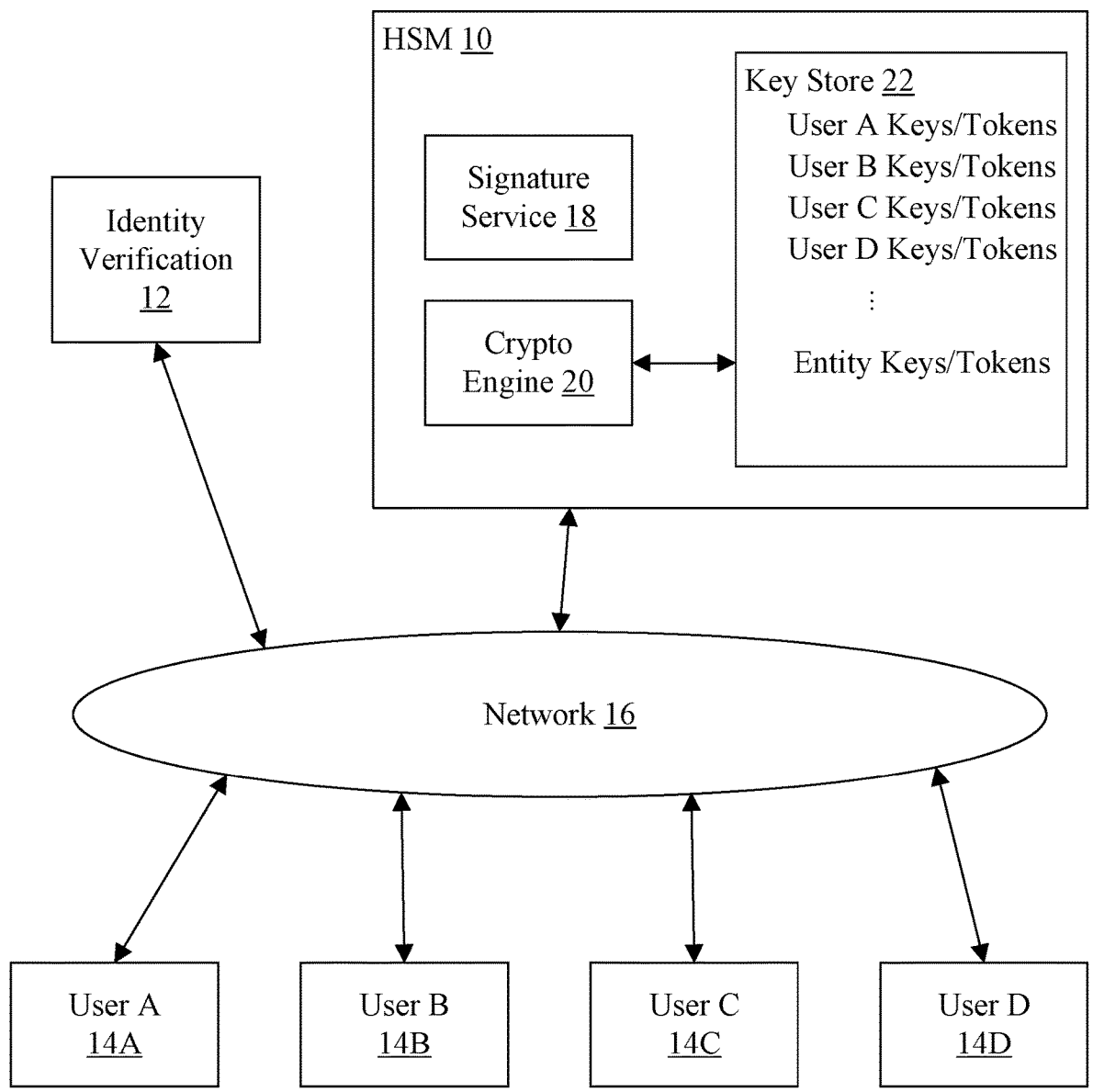
FIG. 1 is a block diagram of one embodiment of a network of computer systems.

Within this disclosure, different entities (which may variously be referred to as "units," "circuits," other components, etc.) may be described or claimed as "configured" to perform one or more tasks or operations. This formulation—[entity] configured to [perform one or more tasks]—is used herein to refer to structure (i.e., something physical, such as an electronic circuit). More specifically, this formulation is used to indicate that this structure is arranged to perform the one or more tasks during operation. A structure can be said to be "configured to" perform some task even if the structure is not currently being operated. A "clock circuit configured to generate an output clock signal" is intended to cover, for example, a circuit that performs this function during operation, even if the circuit in question is not currently being used (e.g., power is not connected to it). Thus, an entity described or recited as "configured to" perform some task refers to something physical, such as a device, circuit, memory storing program instructions executable to implement the task, etc. This phrase is not used herein to refer to something intangible. In general, the circuitry that forms the structure corresponding to "configured to" may include hardware circuits. The hardware circuits may include any combination of combinatorial logic circuitry, clocked storage devices such as flipflops, registers, latches, etc., finite state machines, memory such as static random access memory or embedded dynamic random access memory, custom designed circuitry, analog circuitry, programmable logic arrays, etc. Similarly, various units/circuits/components may be described as performing a task or tasks, for convenience in the description. Such descriptions should be interpreted as including the phrase "configured to."

The term "configured to" is not intended to mean "configurable to." An unprogrammed FPGA, for example, would not be considered to be "configured to" perform some specific function, although it may be "configurable to" perform that function. After appropriate programming, the FPGA may then be configured to perform that function.

Reciting in the appended claims a unit/circuit/component or other structure that is configured to perform one or more tasks is expressly intended not to invoke 35 U.S.C. § 112(f) interpretation for that claim element. Accordingly, none of the claims in this application as filed are intended to be interpreted as having means-plus-function elements. Should Applicant wish to invoke Section 112(f) during prosecution, it will recite claim elements using the "means for" [performing a function] construct.

In an embodiment, hardware circuits in accordance with this disclosure may be implemented by coding the description of the circuit in a hardware description language (HDL) such as Verilog or VHDL. The HDL description may be synthesized against a library of cells designed for a given integrated circuit fabrication technology, and may be modified for timing, power, and other reasons to result in a final design database that may be transmitted to a foundry to generate masks and ultimately produce the integrated circuit. Some hardware circuits or portions thereof may also be custom-designed in a schematic editor and captured into the integrated circuit design along with synthesized circuitry. The integrated circuits may include transistors and may further include other circuit elements (e.g. passive elements such as capacitors, resistors, inductors, etc.) and interconnect between the transistors and circuit elements. Some embodiments may implement multiple integrated circuits coupled together to implement the hardware circuits, and/or discrete elements may be used in some embodiments. Alternatively, the HDL design may be synthesized to a programmable logic array such as a field programmable gate array (FPGA) and may be implemented in the FPGA.

As used herein, the term "based on" or "dependent on" is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor used to determine A or that affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on."

This specification includes references to various embodiments, to indicate that the present disclosure is not intended to refer to one particular implementation, but rather a range of embodiments that fall within the spirit of the present disclosure, including the appended claims. Particular features, structures, or characteristics may be combined in any suitable manner consistent with this disclosure.

DETAILED DESCRIPTION OF EMBODIMENTS

In the following description, an entity and users associated with the entity are used as an example. More generally, there may be a first entity and one or more other entities that are associated with the first entity. The description below may generally apply to any entities. Additionally, while a document signature request is used as an example below, any private token usage request may be managed in a manner similar to that described below and thus the description may apply to any private token usage request. Furthermore, the document may be an example of an electronic object that may be signed. Other embodiments may use a similar mechanism to that presented below to sign electronic objects of any type.

Turning now to FIG. 1, a block diagram of one embodiment of a network of computer systems is shown. In the embodiment of FIG. 1, an HSM 10, an identity verification system 12, a set of user systems 14A-14D, and a network 16 are shown. The HSM 10, the identity verification system 12, and the user systems 14A-14D are coupled to the network 16. There may be any number of users, and user systems, in various embodiments. The HSM 10 includes a cryptographic engine 20 coupled to a key storage (store) 22. A signature service 18 may be implemented on the HSM 10 as described in more detail herein.

Each of the user systems 14A-14D may be owned by and/or assigned to a different user (e.g. user A for system 14A, user B for system 14B, user C for system 14C, and user D for system 14D). A given user may have more than one system assigned to him/her. For example, a given user may have a desktop, laptop, or tablet system assigned to him/her at the entity, one or more mobile devices such as a tablet or smart phone assigned to him/her and/or owned by him/her, and one or more systems at home or other fixed locations.

The identity verification system 12 may be a computer system (e.g. a server) that provides identity verification for the HSM 10, attesting that a given user is indeed the user and not a third party impersonating the user. Any mechanism for identity verification may be used. Generally, the user presents one or more credentials that have previously been associated with the user, and the identity verification system 12 may analyze the credentials to determine that it is the user providing the credentials. For example, the user may have a password or other data that the user (or an administrator for the entity) may have used when creating an account with the identity verification system 12. The user may present the password/data to the identity verification system 12. The user may have previously enrolled answers to one or more security questions that the identity verification system 12 may present to the user for the user to identify himself/herself to the identity verification system 12. The user may have enrolled biometric data such as a fingerprint, photo or other facial recognition data, eye scan data, voice print, etc. The user system 14A-14D may capture corresponding biometric data for the human that is using the system, and may transfer the biometric data to the identity verification system 12 for comparison to the enrolled data. The user may have a cell phone number or email address that may be contacted with a verification code to enter when the user attempts to verify his/her identity with the identity verification system 12. The user may also have a physical security device in his/her possession which may be presented in some way to the identity verification system 12. For example, the physical security device may include a pseudo-random number generating device that is in sync with the identity verification system 12, so that the identity verification system 12 may determine the number that will be generated at a given point in time. The physical security device may be a smart card that could be scanned by the user system 14A-14D (or a peripheral device coupled to the user system) and the data from the smart card may be transmitted to the identity verification system 12. In another example, the physical system 14A-14D from which the user presents credentials may be used as an additional check by the identity verification system 12 (e.g. the systems that are known to be in the user's possession or assigned to the user may be recorded by the identity verification system 12). Multifactor authentication may be used in which two or more mechanisms to prove the user's identity may be used. In response to verifying the user, the identity verification system 12 may directly attest to the HSM 10 that user is verified, or may indirectly attest to the user's identity by issuing an unmodifiable datum (e.g. a security certificate) to the user that can be presented to the HSM 10 to indicate the verification.

The network 16 may include any combination of wired and wireless networks, and combinations of various types of networks. For example, mobile devices/smart phones may communicate via various cellular communications data networks (e.g. 3G, 4G, 5G, etc.), and a cellular communication provider may connect to other networks such as a local area network, wide area network, the Internet, or combinations thereof. In other cases, a user system 14A-14D may be coupled to a local area network (e.g. Ethernet, etc., via wireless or wired connections), wide area network, the Internet, etc.

The key store 22 may store keys/tokens associated with various users (e.g. user A keys/tokens, User B keys/tokens, etc.). Each user may have at least one key/token pair, and may have multiple key/token pairs. The key pairs may be public key/private token pairs that may be used for asymmetric cryptography. The user may have the public keys of each key pair (e.g. stored on the user's system 14A-14D), but may not have the private token of each key pair. The private token may only be stored on the key store 22 and may only be accessible to the crypto engine 20. The use of the HSM 10 to store the private tokens and prevent even the user himself/herself from accessing the private tokens may provide additional security as compared to the user maintaining the private token. When the user has a task to perform using a key/token pair, the user may present the public key to the HSM 10 (and the user's identity may be verified by the identity verification system 12), and the HSM 10 may perform the task use the private token (e.g. encryption/decryption, signing a document, etc.).

Some users may also be authorized to present an entity's public key to request that the HSM 10 sign a document on behalf of the entity. Entity key/token pairs are shown in FIG. 1 as the Entity keys/tokens in the key store 22. The entity may have one or more policies regarding additional users who are affiliated with the entity and whose approval is required in order for the entity to be bound to a document (e.g. for the entity to sign the document). The policy may depend on the nature of the document itself (e.g. what is being agreed to or stated in the document), the dollar amount involved in the commitment represented by the document, if any, etc.

The HSM 10 may provide the signature service 18 for the entity, receiving signature requests for the entity and ensuring that policies are met. Once the policy for a given signature is met, the HSM 10 may apply the entity's signature on the document using the entity's private token. The HSM 10 may return the signed document to the requestor. In an embodiment, a given signature request may include the required approvals and thus the request itself may comply with the applicable policy. Another signature request may include the approval of the transmitting user, and other approvals may be transmitted separately (and recorded by the HSM 10). Yet another signature request may include the approval of the transmitting user and one or more additional users, and other users may also transmit approvals separately. Any combination of included approvals and separately transmitted approvals may be used.

Figure 2:
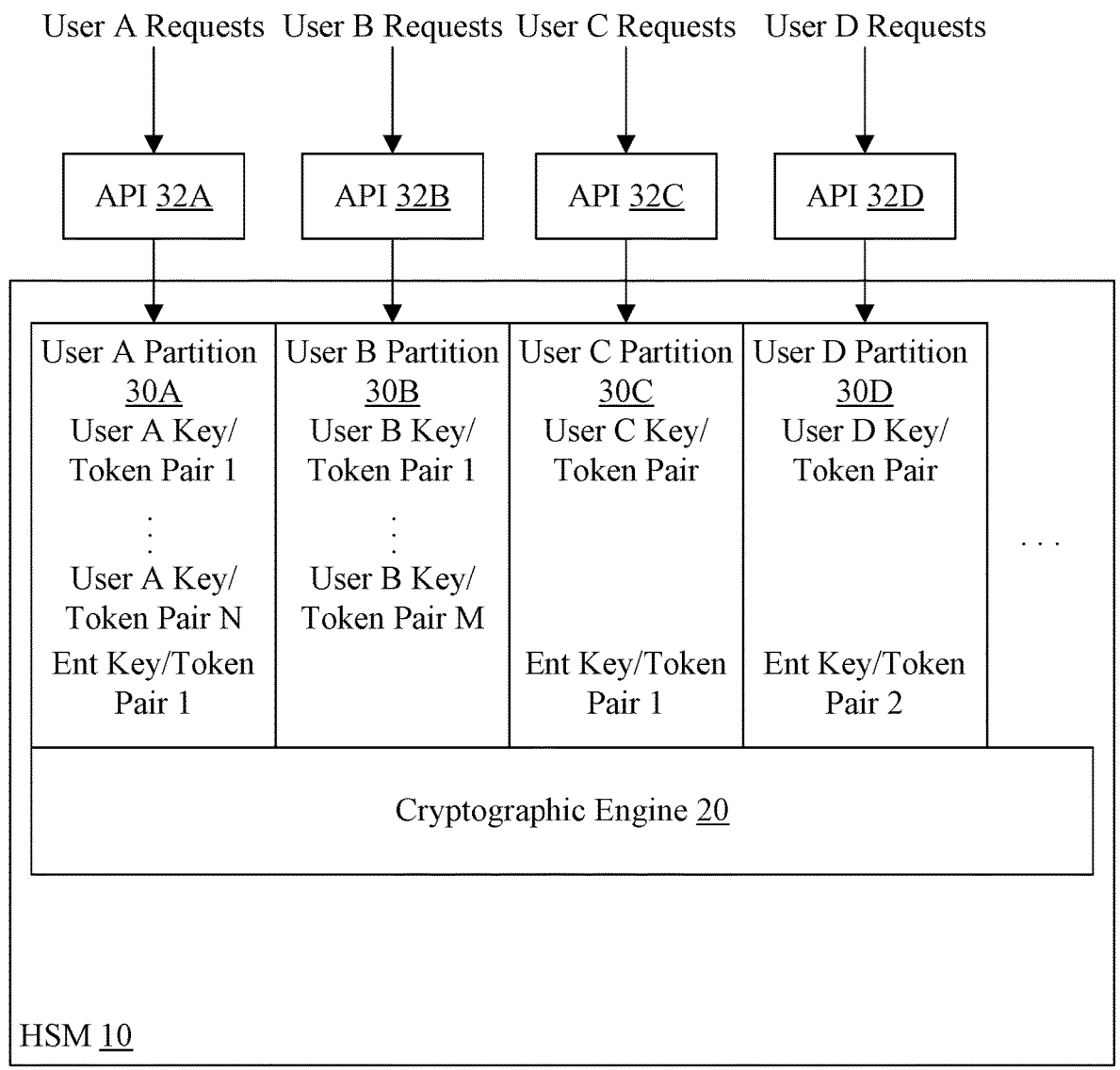
FIG. 2 is a block diagram of one embodiment of a hardware security module shown in FIG. 1.

FIG. 2 is a block diagram of one embodiment the HSM 10 and user interaction with the HSM 10. As illustrated in FIG. 2, each user may have an associated partition 30A-30D in the HSM 10 (e.g. partition 30A may be the partition assigned to user A, the partition 30B may be the partition assigned to user B, etc.). The user's key/token pair or pairs may be included in the user's partition 30A-30D. Additionally, other key/token pairs with which the user is authorized to perform operations may be included in the user's partition 30A-30D. For example, in FIG. 2, the user A may have N key/token pairs and may also be authorized for operations on the entity's key/token pair 1 (Ent key/token pair 1 in FIG. 2). The user B may have M key/token pairs and may not be authorized for any entity keys. The user C has one key/token pair and is also authorized to perform operations for the entity's key/token pair 1. The user D has one key/token pair and is authorized to perform operations on the entity's second key/token pair (Ent key/token pair 2 in FIG. 2).

The partitions 30A-30D illustrate the isolation of the key/token pairs from each other and from users who are not authorized to use them. That is, even if a user has a copy a given public key, the user may not be able to perform an operation with the given public key if the corresponding key/token pair is not in the user's partition. The HSM 10 may not respond to a request using the given public key in such a case, or may respond with an error message, in various embodiments.

In an embodiment, the partitions 30A-30D may be a logical organization and isolation. There may not be multiple copies of each key/token pair, in other words. Instead, the same key/token pair may be invoked within multiple partitions 30A-30D corresponding to users who are authorized for the corresponding key/token pair.

Each partition is addressed using an application programming interface (API) 32A-32D. A given user transmits requests to the HSM 10 (and particularly the user's partition) via the corresponding API 32A-32D. The APIs 32A-32D may reside on the HSM 10, and network packets including the requests may be transmitted to the HSM 10 over the network 16. Alternatively, the APIs 32A-32D may reside on the user systems 14A-14D, and may be invoked by the user when a request is desired. The API 32A-32D on the user's system may form communications to the HSM 10 and may transmit the communications as network packets over the network 16. The cryptographic engine 20 may receive the request and perform the operation using the key/token pair specified by the request, assuming the key/token pair is in the user's partition.

The partitions may be created by an administrator or other authorized user when users are added to the HSM 10. Over time, as a given user's role changes within an entity, the administrator may update the partition to add or remove keys. At any given point in time, the partition may only include the keys that the user is permitted to have or use.

Figure 3:
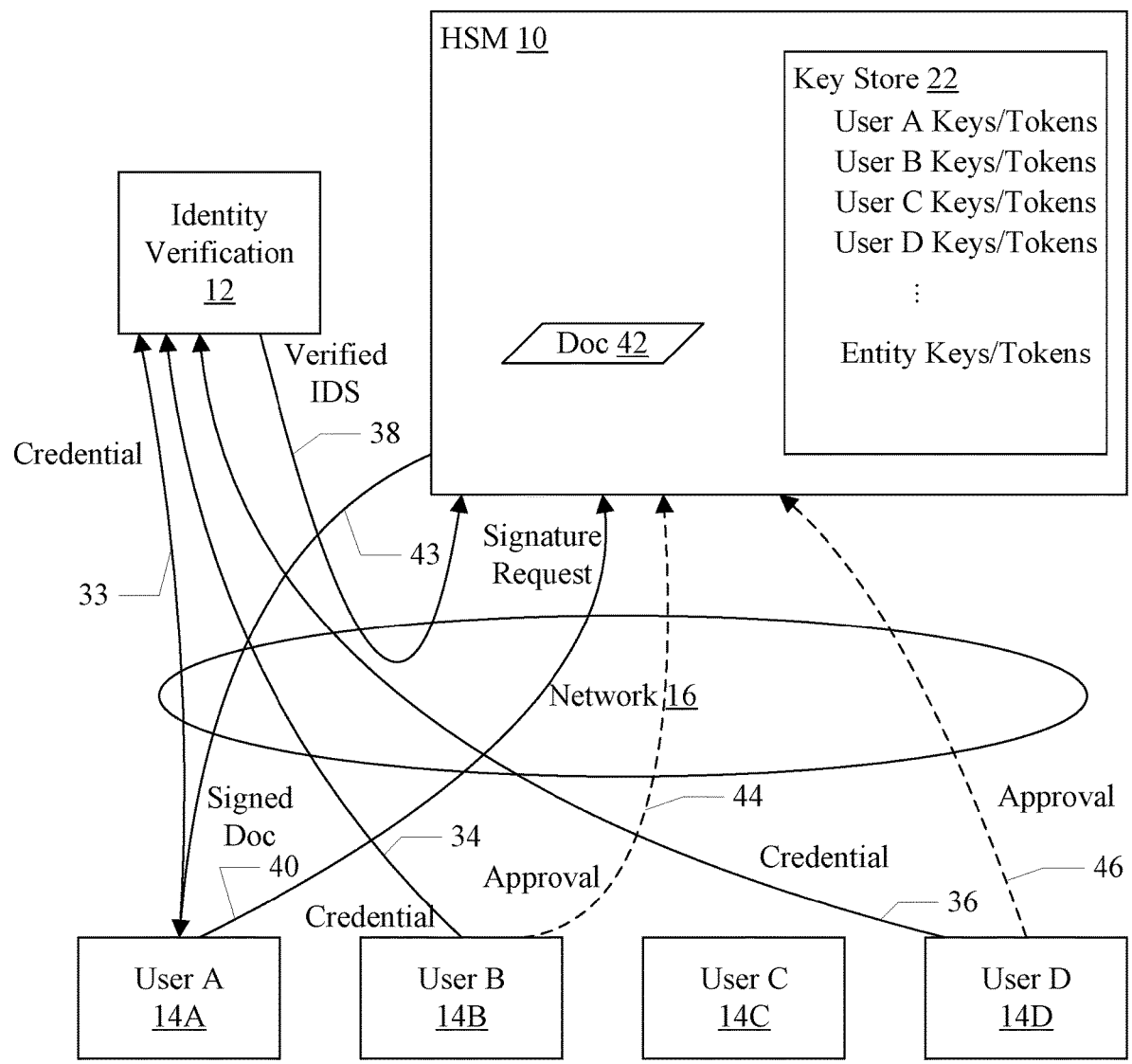
FIG. 3 is a block diagram of one embodiment of messages transmitted between the computer systems shown in FIG. 1.

Turning now to FIG. 3, a block diagram of the network of computer systems shown in FIG. 1 is shown, illustrating exemplary communications among the systems for one embodiment. In this example, the users A, B, and D may be involved in the signature of a document requested by the user A.

Each of the user systems 14A-14D may transmit credentials to the identify verification system 12 (e.g. arrows 33, 34, and 36 from the systems 14A, 14B, and 14D respectively). The identity verification system 12 may supply indications of the verified identities to the HSM 10 (arrow 38). As previously discussed, the indication that the identities are verified may be provided expressly or directly to the HSM 10, or may be provided indirectly by issuing a value or certificate to the user, which may present the certificate to the HSM 10 and which the HSM 10 may confirm with the identity verification system 12.

User A may transmit a signature request for a document (arrow 40). The signature request may include a copy of the document to be signed, which may be captured by the HSM 10 (document 42, in FIG. 3). The signature request from user A, explicitly or implicitly, includes user A's approval to apply the entity's signature to the document 42. In some embodiments, the signature request may explicitly include additional approvals from other users, by including the approval tokens from those other users. For example, the signature request may include the approval of user B and/or user D. In the illustrated example, the approval of user B and user D is sufficient to meet the signature requirements of the entity for the document 42. Thus, if both approvals are included, the signature request may be completed by the HSM 10, which may apply the signature of the entity using the entity's private token, and may return the signed document to the user A (arrow 43).

On the other hand, if the signature request lacks one of the approvals, the user B or D may transmit the approval as a separate message (dashed arrows 44 and 46). The message may include the approval token from that user, for example. The HSM 10 may apply the signature of the entity and return the signed document to the user A after receiving the approvals in this case. The approval of a given user may also be referred to as the consent of the user. In another embodiment, the signature request may be required to include the approvals and the HSM 10 may fail the signature request if a required approval is not present in the request. Thus, the collection of the approvals may occur within the HSM 10 or outside the HSM 10, in various embodiments.

Figure 4:
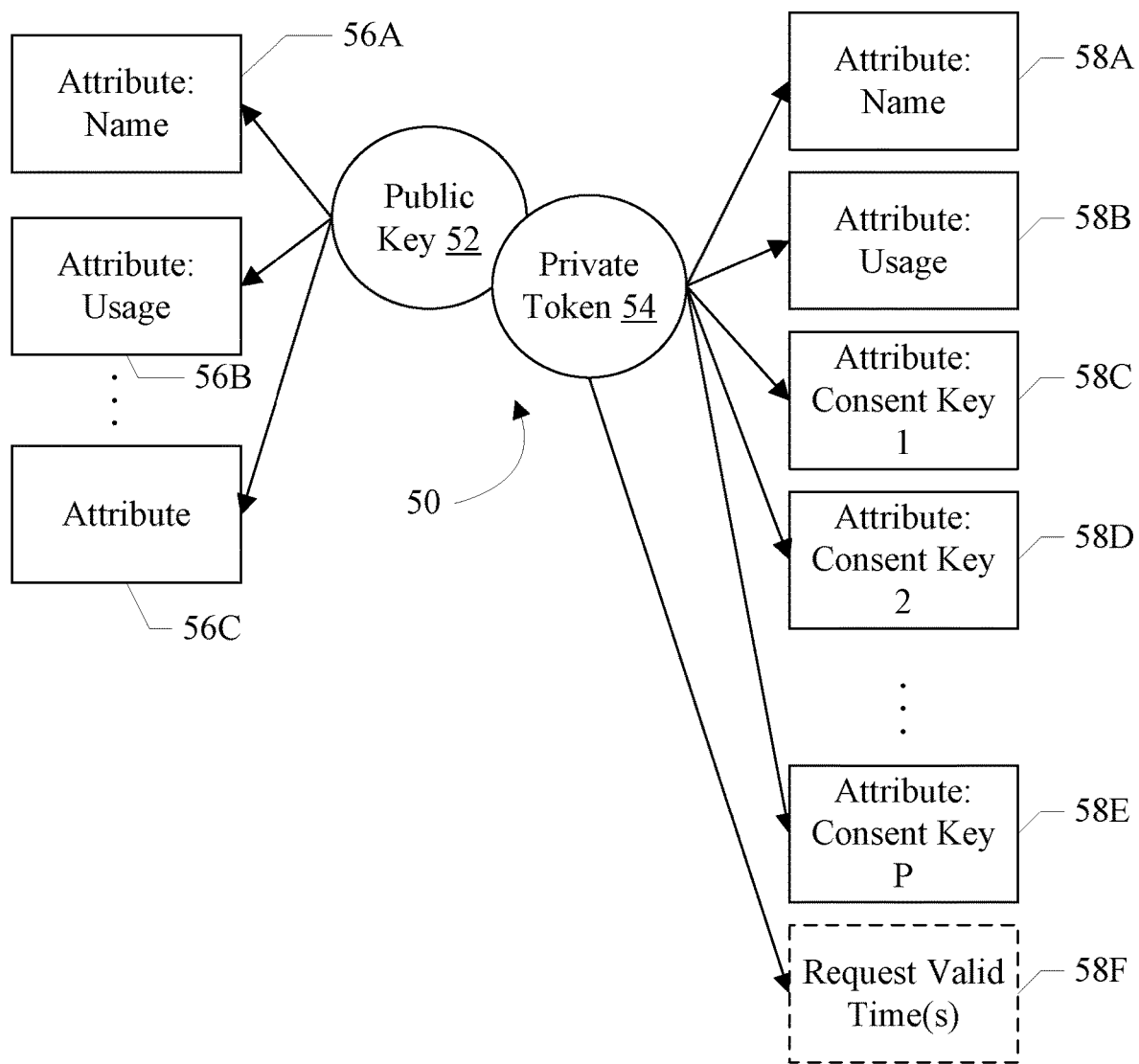
FIG. 4 is a block diagram of one embodiment of a key pair.

FIG. 4 is a block diagram of one embodiment of a key/token pair 50 including a public key 52 and a private token 54. The public key 52 may be augmented with various attributes 56A-56C (e.g. the name of the user or entity may be an attribute 56A, the permitted usage of the key pair 50 may be an attribute 56B, etc.). The permitted usage may include, e.g., a signing usage indicating the key may be used for signing objects such as documents. In an embodiment, the signing attribute may indicate that the key may be used only for signing. In another embodiment, other usages may be permitted using other attributes. Other permitted usages may include blocking, unblocking, and modify. The blocking attribute allows the key to be used to block signature authority for other keys. Similarly, the unblocking attribute allows the key to be used to unblock other keys. A blocked key may not be used for signing (even if it has the signing attribute) until it is unblocked. A key with the modify attribute as able to modify the signing, blocking, unblocking, and modify attributes of other keys.

The private token 54 may also be augmented with various attributes 58A-58F. The attributes 58A and 58B may be name and usage, similar to the attributes 56A-56B. The private token 54 may also be augmented with consent keys (e.g. attributes 58C-58E). The consent keys may be the public keys of users whose approval (or consent) is required for the signature represented by the key pair 50 to be applied. The consent keys may be examples of approval tokens in this embodiment. For example, the key/token pair 50 may be one of the entity keys associated with the entity on whose behalf the signature is to be applied. The consent keys may be the public keys of users that are empowered to provide consent. There may be parameters which specify how many consents are needed (e.g. a minimum number of consents), or may specify that a quorum is needed (e.g. more than half of the consents). That is, Q of the P consents may be required to apply the signature. Any definition of the required consents may be used. Additionally, different consent requirements may be applied depending on the type of document, the dollar amount involved, etc. Also, as mentioned previously, a consent key may have veto empowerment to veto the approval made by other keys.

The attribute 58F may be one or more parameters specifying a valid time for the approvals to be received. For example, the parameters may specify a window of time within which the approvals need to be received. The window may be measured in calendar/clock time (e.g. starting on a certain date/time and ending on a certain date/time) or relative to the transmission or receipt of the signature request. The time parameters may include a "not before" parameter indicating the earliest time at which an approval may be received. The time parameters may include an expiration time, or a duration of the window. Any set of time parameters may be used. The time parameters may be measured via a timestamp, as mentioned above.

Figure 5:
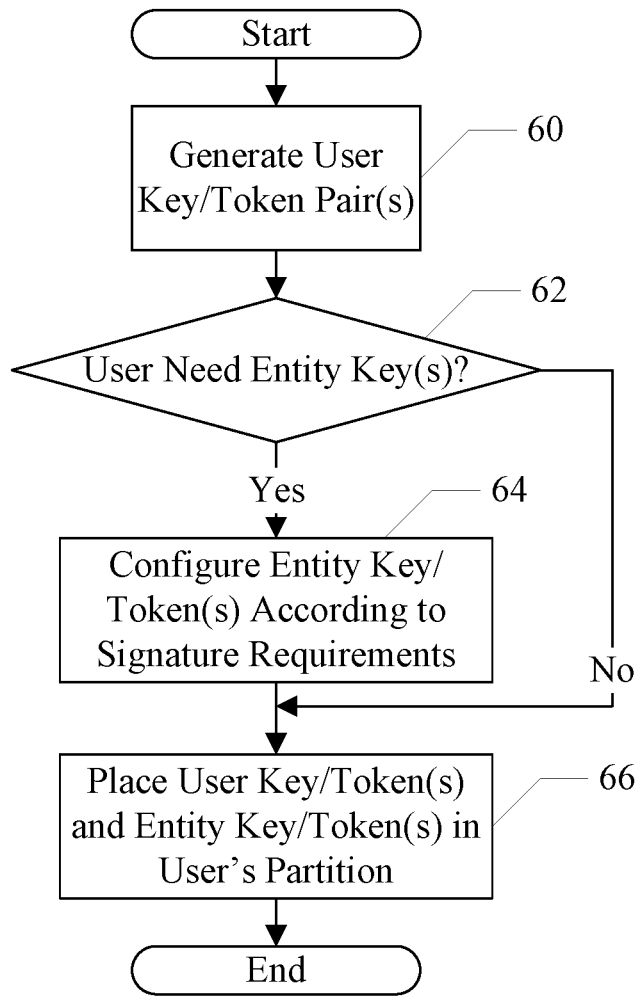
FIG. 5 is a flowchart illustrating one embodiment of key configuration.

FIG. 5 is a flowchart illustrating one embodiment of an administrator configuring a partition and user keys for a user being added to the HSM. While the blocks are shown in a particular order for ease of understanding, other orders may be used. Blocks may be performed in parallel.

The administrator may generate one or more user key/token pairs for the user (block 60). The user key pairs may be stored in the key store 22, and the public keys may be provided to the user. The private tokens are not provided. In an embodiment, even the administrator may not have access to the private token. The HSM 10 may provide an API to generate the keys, and may return the public key to the administrator without revealing the private token. The administrator may also determine various attributes for the key/token pair, including the signing, blocking, unblocking, and modify attributes as mentioned previously.

The administrator may also determine if one or more entity keys are needed for the user (decision block 62). That is, if the user's role includes generating document signature requests that use an entity key, the key may be needed in the user's partition. If so, the administrator may configure the entity key/tokens(s) based on the signature requirements for the documents that the user may request to have signed on behalf of the entity (block 64). The entity key/token may be augmented with consent keys for the user and other users who may be empowered to approve the signature. In various embodiments, the user may or may not be empowered to consent. That is, a user may be empowered to initiate a signature request (and to include the approval of other users in the request, if applicable), but may not be one of the consenters to the signature (or approvers of the signature). If the initiating user is not a consenter/approver, the initiating user's public key may not be included in the consent keys for the entity key/token pair, even though the entity key/token pair is in the user's partition.

The administrator may configure the user's partition on the HSM 10 (block 66). The administrator may place the user key/token(s) and entity keys/tokens(s) (if any) in the user's partition.

As mentioned previously, the user's role in an entity may change over time, which may increase or decrease the user's need to have entity key/tokens available to the user. Entity key/tokens may be added to the user's partition, or deleted from the user's partition, as the role changes using a process similar to blocks 62 and 64.

Figure 6:
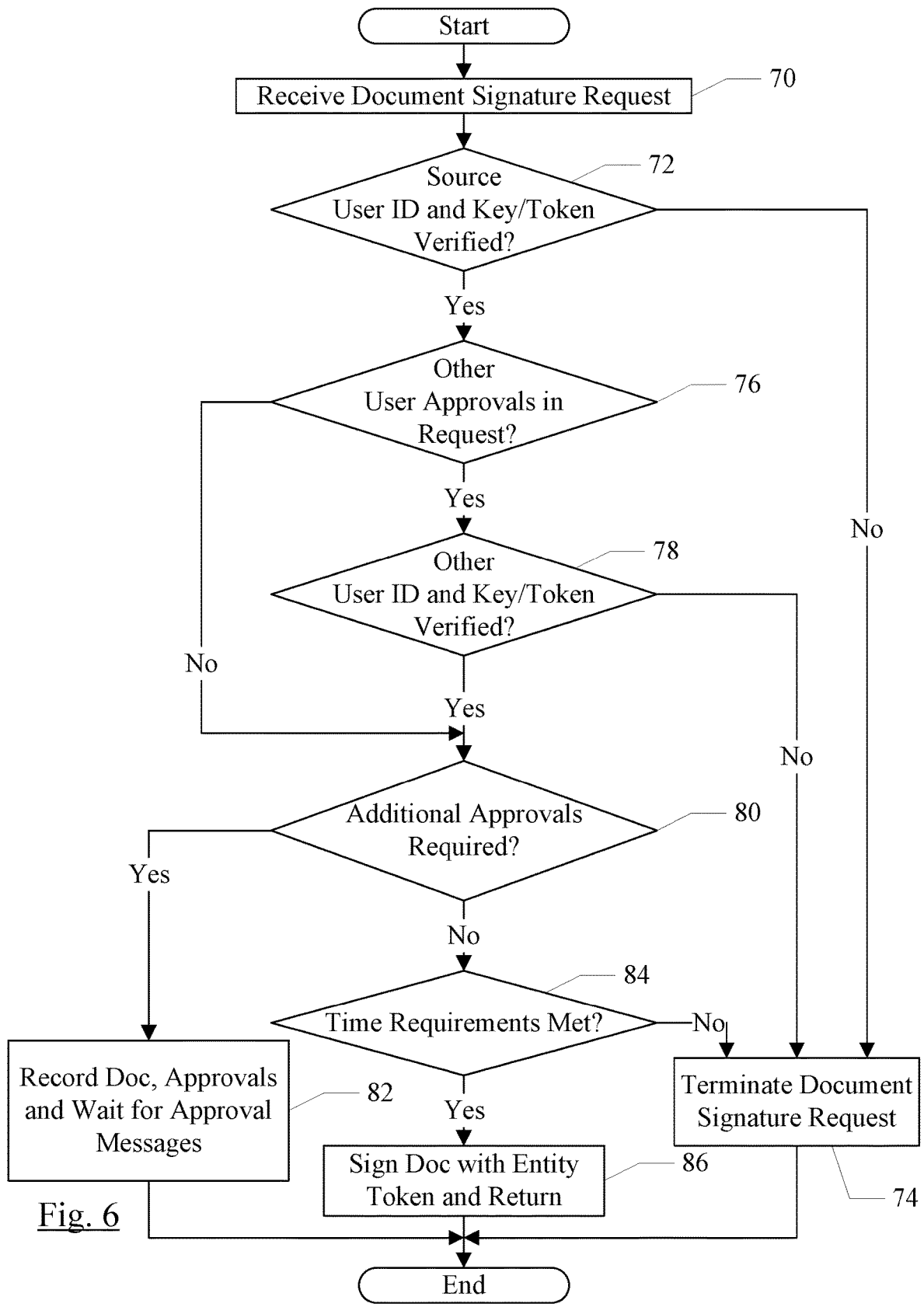
FIG. 6 is a flowchart illustrating operation of one embodiment of the hardware security module to process a document signature request.

FIG. 6 is a flowchart illustrating operation of one embodiment of the HSM 10. While the blocks are shown in a particular order for ease of understanding, other orders may be used. Blocks may be performed in parallel. Blocks, combinations of blocks, and/or the flowchart as a whole may be performed over multiple clock cycles.

The HSM 10 receives a document signature request (block 70), and captures the document to be signed. The HSM 10 may also examine the source's user ID credentials and public key/approval token (decision block 72). The HSM 10 may determine if the user ID is verified by the identify verification system 12, and if the correct public key/approval token for the user is provided (via the consent key attributes of the private token of the entity). If not (decision block 72, "no" leg), the HSM 10 may terminate the document signature request (block 74). Terminating the request may include discarding the document and any accumulated approvals. Terminating the request may also include returning an error notification or other indication that the request will not be completed to the source. In other embodiments, there may be no response for an unsuccessful request. It may be more secure not to respond to an errant request (particularly if the source is the unverified identity) since the source might be a spoof or other attempt to fraudulently obtain the signature and the error indication may provide such a party with information. Alternatively, if the source of the document signature request is verified but another approval is not verified (or the time requirements for the signature are not met, if applicable), the HSM 10 may transmit the indication that the document signature request has been terminated but may not transmit the indication if the source had not been verified successfully.

If the source ID and public key/token are verified (decision block 72, "yes" leg) and the document signature request includes one or more other approvals (decision block 76, "yes" leg), the HSM 10 may also determine if the user ID and public key/token for the other users are verified (decision block 78). If not (decision block 78, "no" leg), the HSM 10 may terminate the document signature request (block 74).

If the other approvals included with the document signature request are verified (decision block 78, "yes" leg) or no other approvals are included in the document signature request (decision block 76, "no" leg), the HSM 10 may determine if other approvals are still required (decision block 80). For example, the other approvals specified by the consent key attributes of the private token of the entity may not have been received (or completely received). Alternatively, if a quorum or other subset of the consent keys are required, other approvals are still needed if the quorum or subset has not been fulfilled. Other requirements are possible as well. For example, a specific subset of the consents may be required in all cases, along with a quorum of the total number of consents. The specific subset may include users with the most authority within the entity for the document.

For example, if the document is a contract, an officer with legal training (e.g. general counsel for the entity) may be required to sign, along with a quorum of other officers or at least one other officer.

If additional approvals are needed (decision block 80, "yes" leg), the HSM 10 may retain the document, record the received approvals, and await additional approvals (block 82). If no additional approvals are required (decision block 80, "no" leg), the HSM 10 may determine if any time requirements are met for the signature (e.g. all approvals received within a time window specified by the request valid time attributes of the entity's private token, if any). If there are time requirements and the time requirements are not met (decision block 84, "no" leg), the HSM 10 may terminate the document signature request (block 74). If there are no time requirements or the time requirements are met (decision block 84, "yes" leg), the HSM 10 may sign the document with the entity's private token and return the signed document to the source (block 86).

Figure 7:
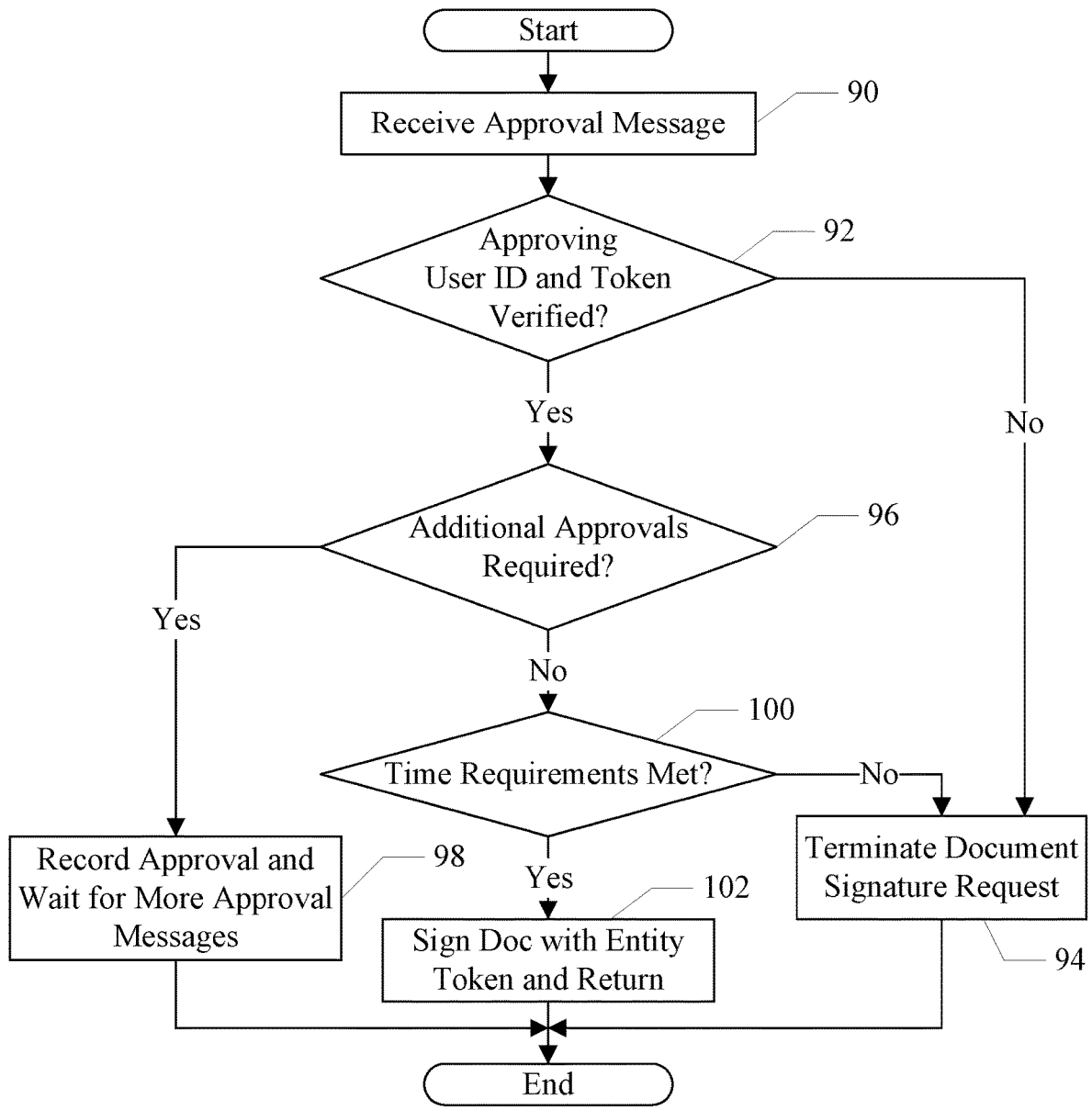
FIG. 7 is a flowchart illustrating operation of one embodiment of the hardware security module to process a signature approval request, in an embodiment.

FIG. 7 is a flowchart illustrating operation of one embodiment of the HSM 10. While the blocks are shown in a particular order for ease of understanding, other orders may be used. Blocks may be performed in parallel. Blocks, combinations of blocks, and/or the flowchart as a whole may be performed over multiple clock cycles.

The HSM 10 may receive an approval message from a user (block 90). The approval message may include the user ID of the approving user, and the approving user's key/approval token. If the approving user ID is not verified by the identity verification system 12 or the correct public key/approval token of the approving user is not provided (as indicated in the consent key attributes of the entity's private token) (decision block 92, "no" leg), the HSM 10 may terminate the document signature request (block 94). If the approval message is a disapproval and the user has veto power (via the veto attribute previously described), the document signature request may also be terminated. Termination may be similar to the previous-described termination with regard to FIG. 6. In an embodiment, the approval message may identify the corresponding document signature request, or may be accompanied by the document to be signed. The HSM 10 may link the document signature request and the approval based on the identifying information, or may compare the document to documents awaiting signature.

If the approving user ID is verified by the identity verification system 12 and the correct public key/approval token of the approving user is provided (as indicated in the consent key attributes of the entity's private token) (decision block 92, "yes" leg), the HSM 10 may determine if other approvals are still required (decision block 96). If additional approvals are needed (decision block 96, "yes" leg), the HSM 10 may record the received approvals and await additional approvals (block 98). If no additional approvals are required (decision block 96, "no" leg), the HSM 10 may determine if any time requirements are met for the signature (e.g. all approvals received within a time window specified by the request valid time attributes of the entity's private token, if any). If there are time requirements and the requirements are not met (decision block 100, "no" leg), the HSM 10 may terminate the document signature request (block 94). If there are no time requirements or the time requirements are met (decision block 100, "yes" leg), the HSM 10 may sign the document with the entity's private token and return the signed document to the source of the document signature request (block 102).

Figure 8:
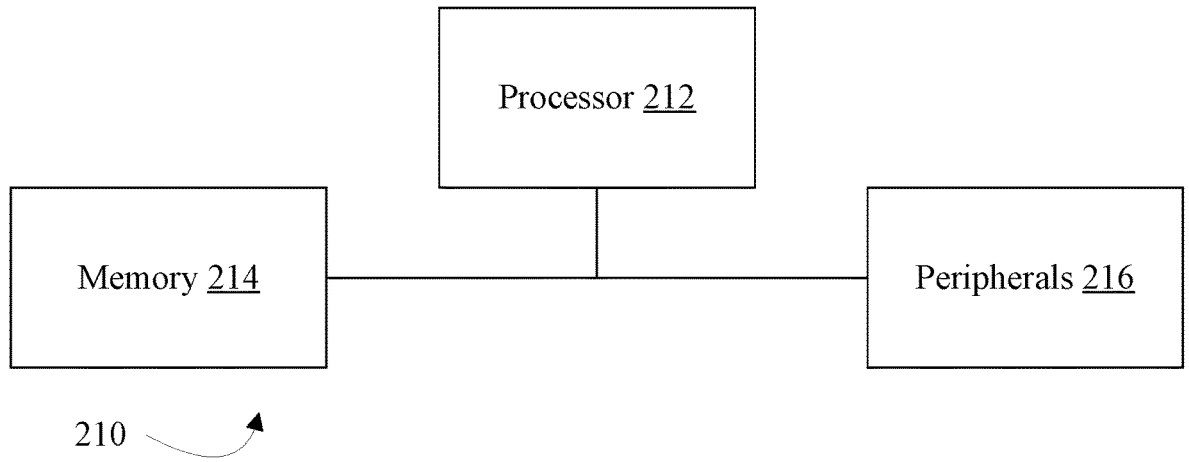
FIG. 8 is a block diagram of one embodiment of a computer system.

Turning now to FIG. 8, a block diagram of one embodiment of an exemplary computer system 210 is shown. In the embodiment of FIG. 8, the computer system 210 includes at least one processor 212, a memory 214, and various peripheral devices 216. The processor 212 is coupled to the memory 214 and the peripheral devices 216.

The processor 212 is configured to execute instructions, including the instructions in the software described herein. In various embodiments, the processor 212 may implement any desired instruction set (e.g. Intel Architecture-32 (IA-32, also known as x86), IA-32 with 64 bit extensions, x86-64, PowerPC, Sparc, MIPS, ARM, IA-64, etc.). In some embodiments, the computer system 210 may include more than one processor. The processor 212 may be the CPU (or CPUs, if more than one processor is included) in the system 210. The processor 212 may be a multi-core processor, in some embodiments.

The processor 212 may be coupled to the memory 214 and the peripheral devices 216 in any desired fashion. For example, in some embodiments, the processor 212 may be coupled to the memory 214 and/or the peripheral devices 216 via various interconnect. Alternatively or in addition, one or more bridges may be used to couple the processor 212, the memory 214, and the peripheral devices 216.

The memory 214 may comprise any type of memory system. For example, the memory 214 may comprise DRAM, and more particularly double data rate (DDR) SDRAM, RDRAM, etc. A memory controller may be included to interface to the memory 214, and/or the processor 212 may include a memory controller. The memory 214 may store the instructions to be executed by the processor 212 during use, data to be operated upon by the processor 212 during use, etc.

Figure 9:
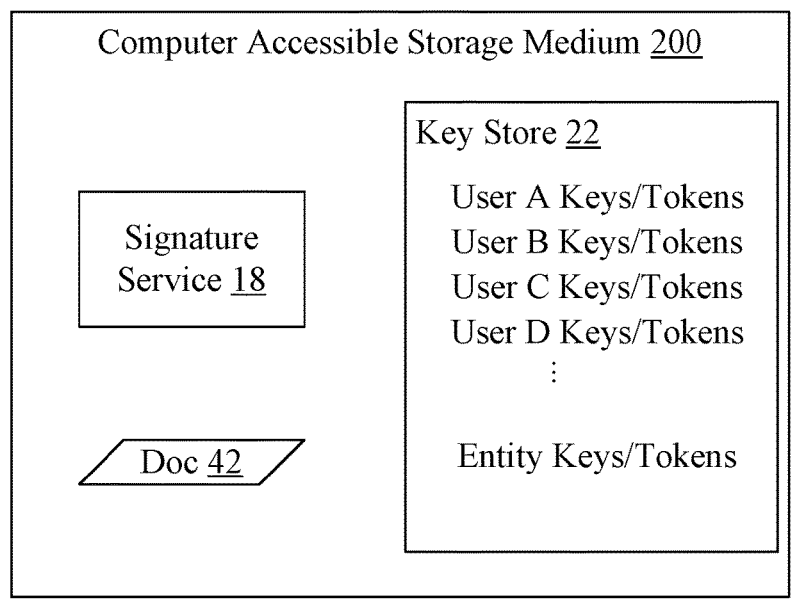
FIG. 9 is a block diagram of one embodiment of a computer accessible storage medium While embodiments described in this disclosure may be susceptible to various modifications and alternative forms, specific embodiments thereof are shown by way of example in the drawings and will herein be described in detail. It should be understood, however, that the drawings and detailed description thereto are not intended to limit the embodiments to the particular form disclosed, but on the contrary, the intention is to cover all modifications, equivalents and alternatives falling within the spirit and scope of the appended claims. The headings used herein are for organizational purposes only and are not meant to be used to limit the scope of the description. As used throughout this application, the word "may" is used in a permissive sense (i.e., meaning having the potential to), rather than the mandatory sense (i.e., meaning must). Similarly, the words "include", "including", and "includes" mean including, but not limited to. As used herein, the terms "first," "second," etc. are used as labels for nouns that they precede, and do not imply any type of ordering (e.g., spatial, temporal, logical, etc.) unless specifically stated.

Peripheral devices 216 may represent any sort of hardware devices that may be included in the computer system 210 or coupled thereto (e.g. storage devices, optionally including a computer accessible storage medium 200 such as the one shown in FIG. 9), other input/output (I/O) devices such as video hardware, audio hardware, user interface devices, networking hardware, various sensors, etc.). Peripheral devices 216 may further include various peripheral interfaces and/or bridges to various peripheral interfaces such as peripheral component interconnect (PCI), PCI Express (PCIe), universal serial bus (USB), etc. The interfaces may be industry-standard interfaces and/or proprietary interfaces. In some embodiments, the processor 212, the memory controller for the memory 214, and one or more of the peripheral devices and/or interfaces may be integrated into an integrated circuit (e.g. a system on a chip (SOC)).

The computer system 210 may be any sort of computer system, including general purpose computer systems such as desktops, laptops, servers, etc. The computer system 210 may be a portable system such as a smart phone, personal digital assistant, tablet, etc.

FIG. 9 is a block diagram of one embodiment of a computer accessible storage medium 200. Generally speaking, a computer accessible storage medium may include any storage media accessible by a computer during use to provide instructions and/or data to the computer. For example, a computer accessible storage medium may include storage media such as magnetic or optical media, e.g., disk (fixed or removable), tape, CD-ROM, DVD-ROM, CD-R, CD-RW, DVD-R, DVD-RW, or Blu-Ray. Storage media may further include volatile or non-volatile memory media such as RAM (e.g. synchronous dynamic RAM (SDRAM), Rambus DRAM (RDRAM), static RAM (SRAM), etc.), ROM, or Flash memory. The storage media may be physically included within the computer to which the storage media provides instructions/data. Alternatively, the storage media may be connected to the computer. For example, the storage media may be connected to the computer over a network or wireless link, such as network attached storage. The storage media may be connected through a peripheral interface such as the Universal Serial Bus (USB). Generally, the computer accessible storage medium 200 may store data in a non-transitory manner, where non-transitory in this context may refer to not transmitting the instructions/data on a signal. For example, non-transitory storage may be volatile (and may lose the stored instructions/data in response to a power down) or non-volatile.

The computer accessible storage medium 200 in FIG. 9 may store code forming the signature service 18, including portions thereof such as APIs for various user computer systems, etc. The computer accessible storage medium 200 may still further store one or more data structures such as the document 42 and/or the key store 22. The signature service 18 may comprise instructions which, when executed, implement the operation described above.

Numerous variations and modifications will become apparent to those skilled in the art once the above disclosure is fully appreciated. It is intended that the following claims be interpreted to embrace all such variations and modifications.

What is claimed is:

1. A hardware security module (HSM) comprising:
a key storage storing a plurality of cryptographic key/token pairs during use, wherein at least a first key/token pair of the plurality of cryptographic key pairs is assigned to a first entity and includes a first private token, and wherein a plurality of entities are associated with the first entity; and
a cryptographic engine coupled to the key storage, the cryptographic engine configured to respond to a private token usage request for the first private token received from a second entity of the plurality of entities with a cryptographically-signed object signed using the first private token responsive to determining, in the cryptographic engine, that one or more approvals from one or more third entities of the plurality of entities have been received by the cryptographic engine, wherein the approvals are indicated via approval tokens corresponding to the third entities from one or more verified sources, wherein the first private token is augmented with public keys of the one or more third entities to indicate the approvals of the one or more third entities are required, and wherein the first private token is further augmented with one or more time parameters, wherein the cryptographic engine is configured to respond with the cryptographically-signed object responsive to the approvals being received within a time period indicated by the one or more time parameters.

2. The HSM as recited in claim 1 wherein the private token usage request includes at least a subset of one or more approvals.

3. The HSM as recited in claim 2 wherein the cryptographic engine is configured to record the subset of the one or more approvals in response to the private token usage request, and to wait for additional approvals prior to responding to the private token usage request with the cryptographically-signed object.

4. The HSM as recited in claim 3 wherein a remaining subset of the one or more approvals are received as one or more approval messages from the one or more third entities.

5. The HSM as recited in claim 1 wherein the private token usage request includes the one or more approvals, and the cryptographic engine is configured to respond with the cryptographically-signed object directly in response to the private token usage request.

6. The HSM as recited in claim 1 wherein the HSM is divided into a plurality of partitions corresponding to the plurality of entities, and wherein a first partition assigned to the second entity includes the first key/token pair.

7. The HSM as recited in claim 6 wherein each entity of the plurality of entities is configured to communicate with the corresponding partition of the plurality of partitions through an application programming interface to the HSM, whereby the first private token is not accessible to the second entity even though the first partition includes the first key/token pair.

8. The HSM as recited in claim 1 wherein the plurality of cryptographic key/token pairs comprise a plurality of second cryptographic key/token pairs assigned to the plurality of entities.

9. The HSM as recited in claim 1 wherein the first private token is augmented with one or more parameters that specify one or more consent requirements that are to be satisfied before the cryptographic engine provides the cryptographically-signed object.

10. The HSM as recited in claim 1 wherein the first private token is augmented with one or more usage attributes specifying permitted usages of the first private token.

11. The HSM as recited in claim 1 wherein the cryptographic engine is configured to apply one or more requirements combined by logical connectors.

12. A hardware security module (HSM) comprising:
a key storage storing a plurality of cryptographic key/token pairs during use, wherein at least a first key/token pair of the plurality of cryptographic key/token pairs is assigned to a first entity and a plurality of users are associated with the first entity, and wherein a first subset of the plurality of users which are permitted to approve a signature of the first entity are associated with a first private token of the first key/token pair; and
a cryptographic engine coupled to the key storage, the cryptographic engine configured to cryptographically-sign a document using the first private token on behalf of the first entity responsive to a request from one of the plurality of users and further responsive to determining that a plurality of approvals have been received from the first subset of the plurality of users, and wherein one or more time parameters are associated with the first private token, and wherein the cryptographic engine is configured to terminate an attempt to cryptographically sign the document on behalf of the first entity in response to a failure to receive the approvals within a time frame defined by the one or more time parameters.

13. The HSM as recited in claim 12 wherein the plurality of approvals are received from a second subset of the first subset of the plurality of users, wherein the second subset excludes at least one user that is in the first subset.

14. The HSM as recited in claim 12 wherein the plurality of approvals are received from a second subset of the first subset of the plurality of users, wherein the second subset is a quorum of the first subset.

15. A method comprising:
storing a plurality of cryptographic key/token pairs in a key storage of a hardware security module (HSM), wherein at least a first key/token pair of the plurality of cryptographic key/token pairs is assigned to a first entity and includes a first private token, and wherein a plurality of entities are associated with the first entity; and responding, from a cryptographic engine in the HSM, to a private token usage request for the first private token received from a second entity of the plurality of entities with a cryptographically-signed object signed using the first private token responsive to determining, in the cryptographic engine, that one or more approvals from one or more third entities the plurality of entities have been received by the cryptographic engine, wherein the approvals are indicated via approval tokens corresponding to the third entities from one or more verified sources wherein the first private token is augmented with public keys of the one or more third entities to indicate the approvals of the one or more third entities are required, and wherein the first private token is further augmented with one or more time parameters, and wherein the responding with the cryptographically-signed object is further responsive to the one or more approvals being received within a time period indicated by the one or more time parameters.

16. The method as recited in claim 15 wherein the one or more approvals are received from a subset of the one or more third entities, wherein the subset is a quorum of the one or more third entities.

17. The method as recited in claim 15 wherein the first private token is augmented with one or more usage attributes specifying permitted usages of the first private token.

18. The method as recited in claim 15 further comprising applying, by the cryptographic engine, one or more requirements combined by logical connectors.

19. The method as recited in claim 15 wherein the private token usage request includes at least a subset of one or more approvals.

20. The method as recited in claim 19 further comprising:
recording, by the cryptographic engine, the subset of the one or more approvals in response to the private token usage request; and
waiting, by the cryptographic engine, for additional approvals prior to responding to the private token usage request with the cryptographically-signed object.

21. The method as recited in claim 20 further comprising receiving, by the cryptographic engine, a remaining subset of the one or more approvals as one or more approval messages from the one or more third entities.

22. The method as recited in claim 15 wherein the private token usage request includes the one or more approvals, and the method further comprises responding, by the cryptographic engine, with the cryptographically-signed object directly in response to the private token usage request.

* * * * *